(12) United States Patent
Hall

(10) Patent No.: US 7,127,136 B2
(45) Date of Patent: Oct. 24, 2006

(54) OPTICAL CROSSBAR SWITCH

(75) Inventor: Trevor James Hall, Ottawa (CA)

(73) Assignee: University of Ottawa, Ontario (CA)

( * ) Notice: Subject to any disclaimer, the term of this patent is extended or adjusted under 35 U.S.C. 154(b) by 0 days.

(21) Appl. No.: 10/494,887

(22) PCT Filed: Nov. 6, 2002

(86) PCT No.: PCT/GB02/04990

§ 371 (c)(1),
(2), (4) Date: Oct. 22, 2004

(87) PCT Pub. No.: WO03/041421

PCT Pub. Date: May 15, 2003

(65) Prior Publication Data

US 2005/0040021 A1   Feb. 24, 2005

(30) Foreign Application Priority Data

Nov. 7, 2001   (GB) .................................. 0126822.6

(51) Int. Cl.
 *G02B 6/35* (2006.01)
(52) U.S. Cl. .............................. 385/16; 385/17; 385/18
(58) Field of Classification Search ..................... None
See application file for complete search history.

(56) References Cited

U.S. PATENT DOCUMENTS

| | | | |
|---|---|---|---|
| 4,074,142 A * | 2/1978 | Jackson ....................... 250/551 |
| 5,495,356 A | 2/1996 | Sharoney et al. |
| 6,424,756 B1 * | 7/2002 | Kalman et al. ................ 385/16 |
| 6,618,517 B1 * | 9/2003 | Ducellier et al. ............. 385/17 |
| 6,704,476 B1 * | 3/2004 | Ford et al. ..................... 385/18 |
| 6,728,434 B1 * | 4/2004 | Flanders ........................ 385/18 |
| 6,870,985 B1 * | 3/2005 | Noonan ........................ 385/17 |
| 6,898,013 B1 * | 5/2005 | Hall ............................. 359/618 |

FOREIGN PATENT DOCUMENTS

| | | |
|---|---|---|
| EP | 0 717 571 A2 | 6/1996 |
| GB | 2 243 967 A | 11/1991 |

OTHER PUBLICATIONS

International Search Report for PCT Application No. PCT/B02/04990, Filed Nov. 6, 2002; Search Report Completed Jun. 20, 2003; Search Report Mailed Jul. 1, 2003.

* cited by examiner

*Primary Examiner*—John D. Lee
*Assistant Examiner*—Omar Rojas
(74) *Attorney, Agent, or Firm*—Alston & Bird LLP

(57) ABSTRACT

An optical crossbar switch comprises a plurality of input devices (1A to 1C), a plurality of output devices (2A to 2C), an optical transpose system (3) positioned between the input devices and the output devices, and control means for controlling the interconnections between the input devices and the output devices.

19 Claims, 18 Drawing Sheets

OPTICAL CROSSBAR SWITCH

FIELD OF THE INVENTION

This invention relates to an optical crossbar switch, and in particular to an optical crossbar switch incorporating an optical transpose system.

BACKGROUND OF THE INVENTION

A crossbar switch is a switch which can be used to interconnect any one of a plurality of inputs to any one of a plurality of outputs. Crossbar switches can be electromechanical, electrical or optical. In principle, optical interconnect technologies offer several advantages over electromechanical and electrical systems. Thus, connections can be made at higher speeds with less crosstalk and less power consumption than electrical channels. Moreover, the power required is almost independent of the length of the connection, at least over the length of connections involved within a parallel configuration.

FIG. 1 shows a simple crossbar switch having three inputs I1, I2 and I3, three outputs 01, 02 and 03, and nine switches located at the cross points of the inputs and outputs. Clearly, by suitably controlling the switches, any input can be connected to any output.

The simple crossbar switch shown in FIG. 1 is topologically equivalent to each of the optical crossbar switches illustrated schematically in FIGS. 2 to 4. Thus, each of FIGS. 2 to 4 shows an optical crossbar switch having a localised fan-out of each input I1, I2 and I3, followed by an optical transposition, followed by a localised fan-in into each output 01, 02 and 03. In FIG. 2, the cross points (switches) are located at the inputs downstream of the fan-out. In FIG. 3, the cross points are located at the outputs upstream of the fan-in; and, in FIG. 4, the cross points are positioned in the paths of the optical transpose.

An optical crossbar switch may be a broadcast-and-select switch, that is to say a switch in which signals are sent down all paths from the inputs, and selection is made at the outputs by switching devices, or a route-and-select switch, in which initial path selection is made at the inputs, and selection is made at the outputs to deflect signals to the appropriate light receptor, a respective light receptor being associated with each of the outputs.

The specification of our International Patent Application number PCT/GB01/03643 describes an optical transpose system, that is to say an apparatus for the optical transpose (or optical rearrangement) of signals. That optical transpose system has three stages, the first of which consists of an array of mesolenses that image the light from an array of light sources in an input plane, and the third of which consists of an array of mesolenses that image light onto an array of receiving devices in an output plane. The second optical stage is a macrolens placed between the two arrays of mesolenses, so as to re-arrange the beams input thereto from the first optical stage for direction to the third optical stage. The system is such that each light source is connected to a respective receiving device and vice versa, and the interconnection pattern corresponds to a transposition.

SUMMARY OF THE INVENTION

The present invention utilises such an optical transpose system to provide optical crossbar switches having improved properties.

The present invention provides an optical crossbar switch comprising a plurality of input devices, a plurality of output devices, an optical transpose system positioned between the input devices and the output devices, and control means for controlling the interconnections between the input devices and the output devices.

Advantageously, the optical transpose system has first, second and third stages, the first stage being such as to direct light from the input devices, the second stage being such as to re-arrange beams input thereto from the first stage for re-direction to the third stage, and the third stage being such as to direct light input thereto to the output devices.

In a preferred embodiment, the switch is configured as a broacast-and-select switch. In this case, the control means may be constituted by means for electrically gating the output devices, by means for electrically gating the input devices, by means for optically shuttering the input devices, or by means for optically shuttering the output devices.

Preferably, each of the input devices is constituted by a plurality of light sources, and each of the output devices is constituted by a plurality of light sinks.

In another preferred embodiment, the switch is configured as a route-and-select switch.

Conveniently, the route-and-select switch is configured using transmission geometry. In this case, the first stage is constituted by a plurality of first mesolenses, there being one first mesolens associated with each of the input devices, the second stage is a macrolens, and the third stage is a plurality of second mesolenses, there being one second mesolens associated with each of the output devices, and wherein the control means is constituted by a plurality of first deflectors, each first deflector being associated with a respective first mesolens, and by a plurality of second deflectors, each second deflector being associated with a respective second mesolens.

Advantageously, each of the deflectors is a programmable deflector, preferably a transmission spatial light modulator (SLM).

Alternatively, the route-and-select switch is configured using reflection geometry. In this case, respective first, second and third macrolenses constitutes the first, second and third stages, and wherein the control means is constituted by a plurality of first deflectors positioned between the second and third macrolenses, and by a plurality of second deflectors positioned between the first and second macrolenses, there being the same number of first and second deflectors as there are input devices and output devices.

Advantageously, each of the deflectors is a programmable deflector, preferably a reflective SLM.

BRIEF DESCRIPTION OF DRAWINGS

The present invention is concerned with both these types of optical crossbar switch, and various forms of switch constructed in accordance with the invention will be described in greater detail, by way of example, with reference to drawings, in which:

FIG. 3 shows an optical crossbar switch generally as in FIG. 2, but having the switches located at the outputs upstream of the fan-in;

DETAILED DESCRIPTION OF THE INVENTION

Figure 2:
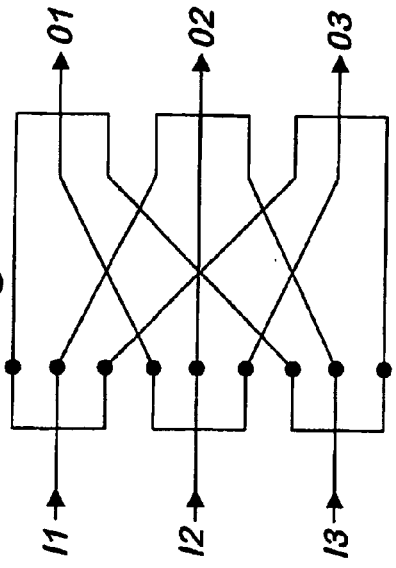
FIG. 2 shows an optical crossbar switch topologically equivalent to that of FIG. 1, having a localized fan-out of each input, followed by an optical transposition, followed by a localized fan-in into each output, wherein the switches are located at the inputs downstream of the fan-out.
Figure 4:
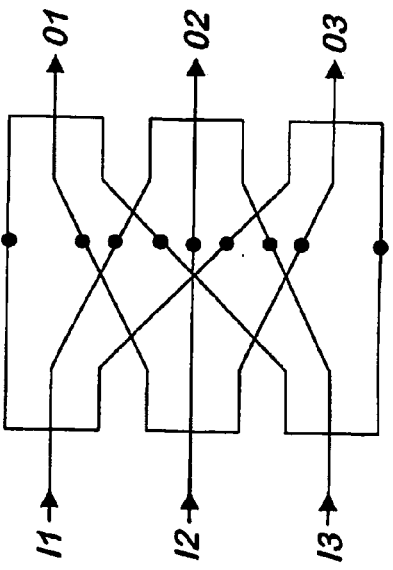
FIG. 4 shows an optical crossbar switch generally as in FIG. 2, but having the switches located in the paths of the optical transpose.
Figure 1:
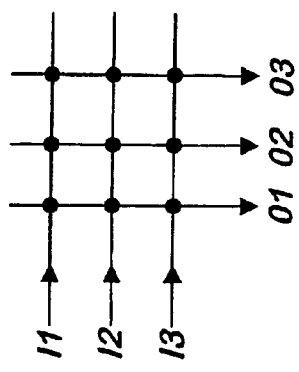
FIG. 1 shows a simple crossbar switch having three inputs and three outputs, and nine switches located at the cross points of the inputs and outputs.
Figure 3:
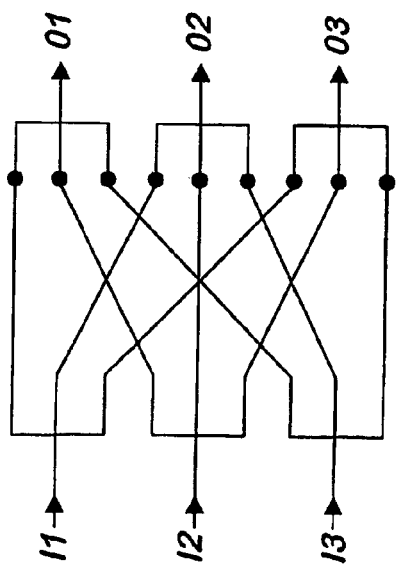
Figure 5:
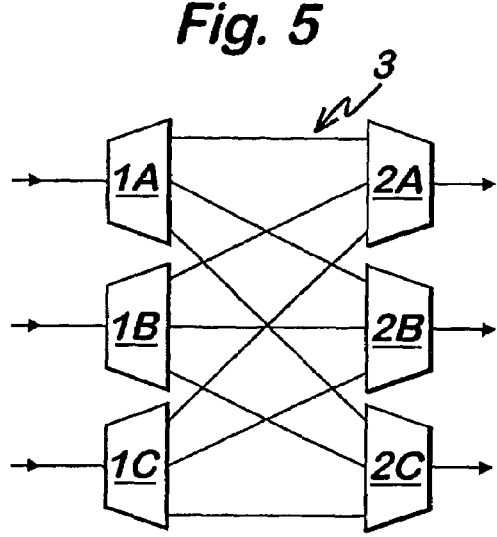
FIG. 5 is a schematic representation of a simple route-and-select optical crossbar switch.

Referring the drawings, FIG. 5 shows schematically a simple route-and-select optical crossbar switch having three input switches 1A, 1B and 1C, three output switches 2A, 2B and 2C and an optical transpose system (indicated generally by the reference numeral 3) sandwiched between the input switches and the output switches. The optical transpose system may be as described in the specification of our international patent application No. PCT/GB01/03643.

Figure 6:
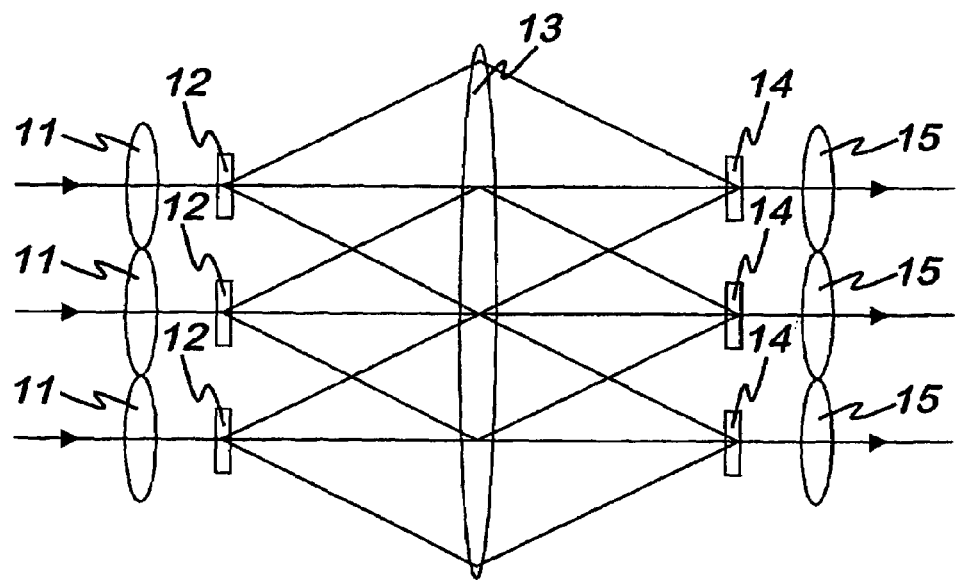
FIG. 6 is a schematic representation of a route-and-select optical crossbar switch using transmission geometry.

FIG. 6 is a schematic representation of a route-and-select optical crossbar switch using transmission geometry. This switch includes nine mesolenses 11 arranged in a 3×3 regular grid, each of which is associated with a respective light source (not shown). A respective SLM 12 is associated with each of the mesolenses 11. Each of the SLMs 12 has nine output beams corresponding to its input beam from the respective mesolens 11, and the SLMs are programmable to deflect the input beam into the required output beam direction. A macrolens 13 rearranges the beams input thereto from the SLMs 12, and directs these beams to nine SLMs 14, each of which is associated with a respective mesolens 15. Each mesolens 15 is associated with a respective light receiving device (not shown). It will be apparent that, by suitable programming of the SLMs 12 and 14, any light source can be switched to any light receiving device.

Figure 7:
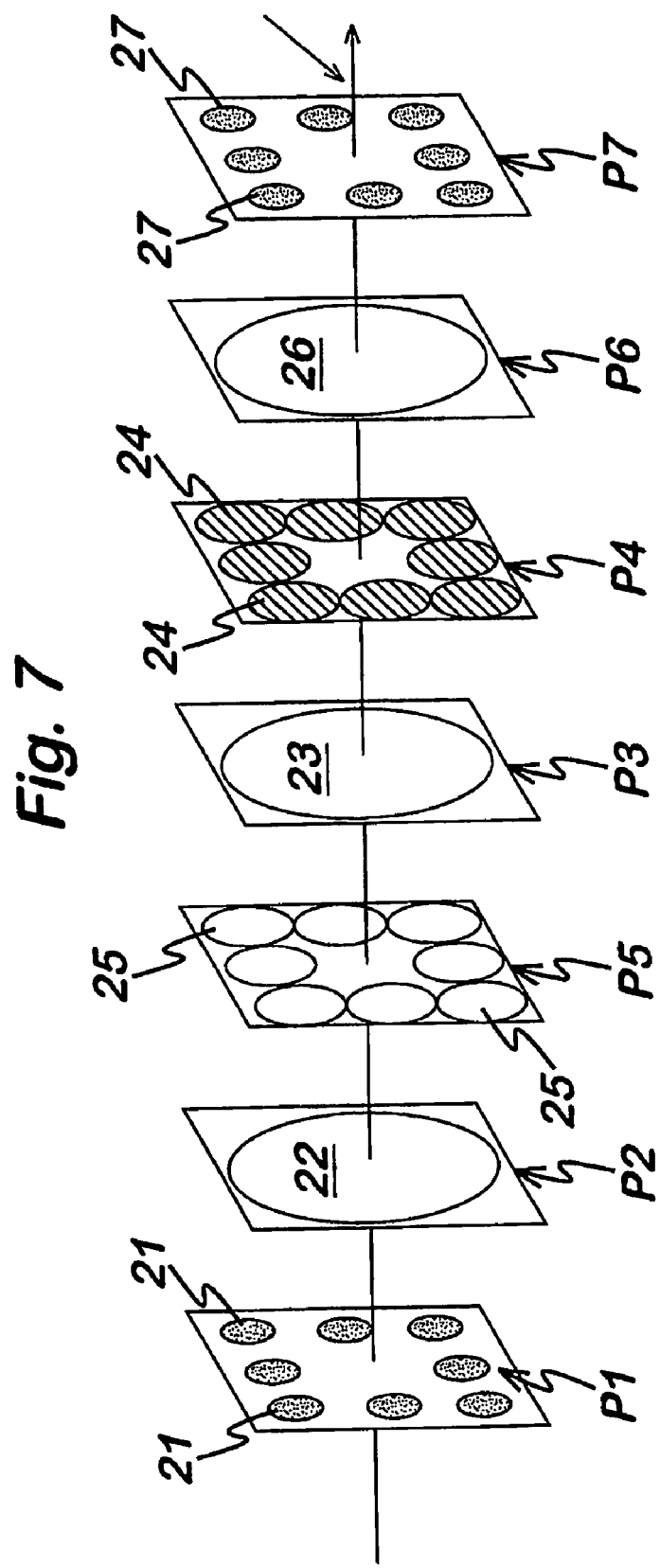
FIG. 7 is a schematic representation of a route-and-select optical crossbar switch using reflective geometry.

FIG. 7 is a schematic representation of a route-and-select optical crossbar switch using reflective geometry. This switch includes eight input transmitters 21 which are arranged in a plane P1, the transmitters being the form of a regular 3×3 grid array with the middle member missing. The beams (not shown) from the transmitters 21 pass through a lens 22 in a plane P2 and a lens 23 in a plane P3 to a first deflector array of eight SLMs 24. The SLMs 24 are arranged in a plane P4 in a regular 3×3 grid array with the central member missing. This arrangement could be modified by omitting any member of the 3×3 grid.

The SLMs 24 act to reflect incoming beams back through the lens 23 to a second deflector array constituted eight SLMs 25. The SLMs 25 are arranged in a plane P5 in a regular 3×3 grid with the central member missing. The SLMs 25 reflect incoming beams back through the lens 23 and an output lens 26 (in a plane P6) to eight light receptors 27. The receptors 27 are arranged in a plane P7 in a regular 3×3 grid with the central member missing.

The arrangement is such that the lenses 22 and 23 together image the transmitters 21 on to the SLMs 24 of the first deflector array. The lenses 26 and 23 image the output plane receptors 27 on to the SLMs 25 of the second deflector array. The lens 23 converts the angular deflection of light beams received from the SLMs 24 into spatial shifts of light onto the SLMs 25 of the second deflector array. Thus, each SLM 24 allows light from its associated transmitter 21 to be directed onto any one of the SLMs 25 of the second deflector array. The SLMs 25 correct the angle of incidence of the light from a given transmitter 21 so that it reaches an associated receptor 27.

In practice, the transmitters 21, which may be optical fibers, lasers, modulators or light emitting diodes (LEDs) and the receptors 27, which may be optical fibers or photo receivers, may be placed respectively slightly in front of the plane of the transmitters and behind the plane of the receptors. In this case, microlens arrays (not shown) could be placed in the input plane and the output plane in the positions where the transmitters 21 and 27 are not shown to be, to match the characteristics of the actual transmitters and receptors used to the beam parameters within the optical cross connect. The lenses 22, 23 and 26 perform an optical Fourier transform, and may be constructed as compound lenses.

It will be apparent that, by suitable programming of the SLMs 24 and 25, any transmitter 21 can be switched to any receptor 27.

Figure 8:
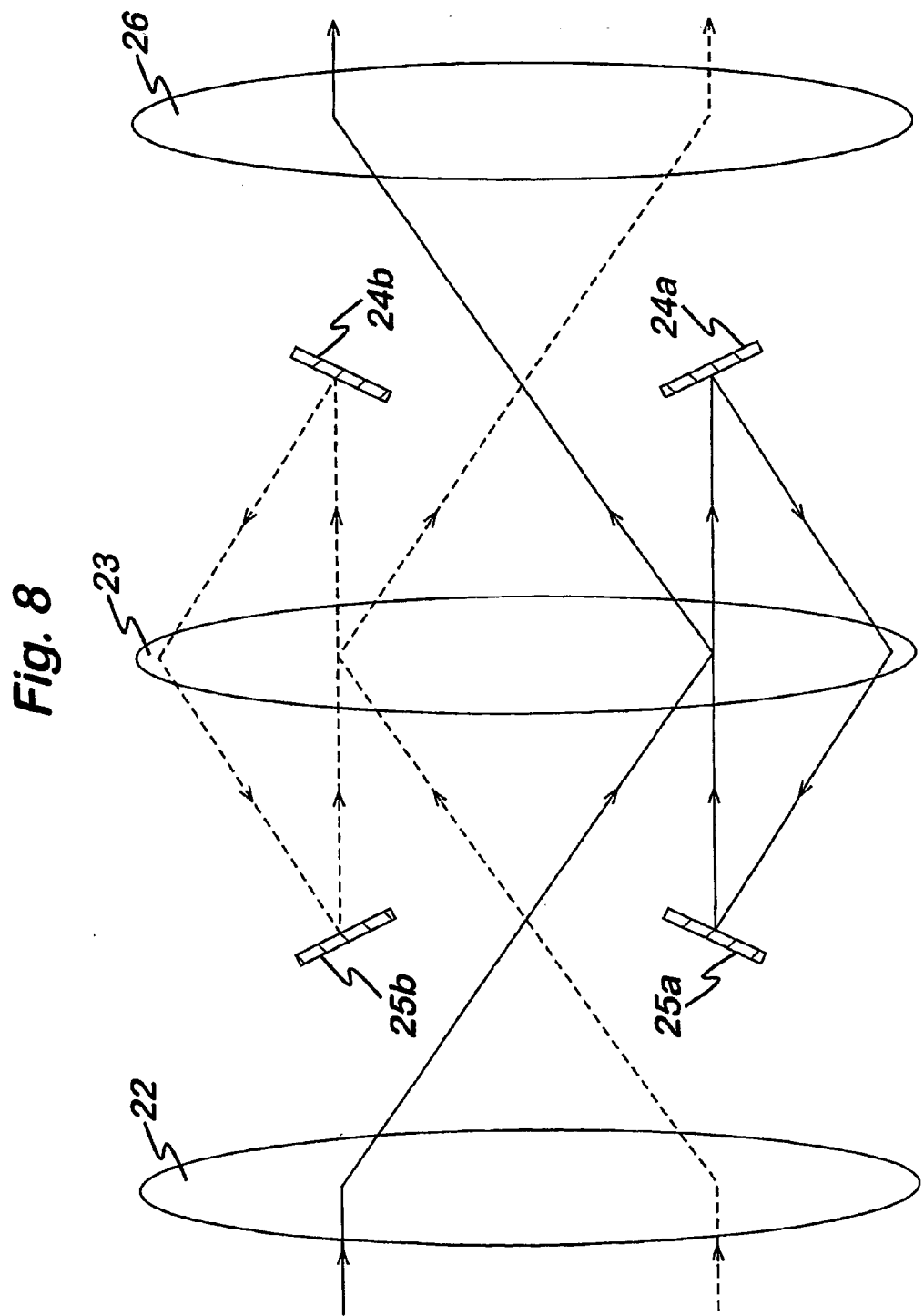
FIG. 8 is a simplified diagram equivalent to FIG. 7, showing a first way in which the passage of rays from two light sources is controlled.

FIG. 8 is a schematic representation of the switch of FIG. 7 illustrating how two incident beams are routed through the switch. For simplicity, the FIG. 8 shows only the lenses 22, 23 and 26, and four of the deflectors 24 and 25. In this figure, the deflectors 24 and 25 are shown as plane mirrors, but it will be appreciated that, in practice, they are SLMs as described above with reference to FIG. 7.

Considering a light beam incident upon the lens 22 from one of the transmitters 21 (not shown in FIG. 8) this beam being shown in full lines. The beam passes through the lens 22, through the lens 23 and then to the deflector 24a, where it is reflected back through the lens 23 and on to the deflector 25a, where it is reflected back to the lens 23 where it is redirected to the lens 26. The beam is then redirected to an output plane receptor 27 (not shown in FIG. 8). In a similar manner another beam incident upon the lens 22, this being shown in dotted lines, passes to the lens 23, then to the deflector 24b, then to the lens 23, then to the deflector 25b, then to the lens 23, then to the lens 26, and finally to an output receptor.

Figure 9:
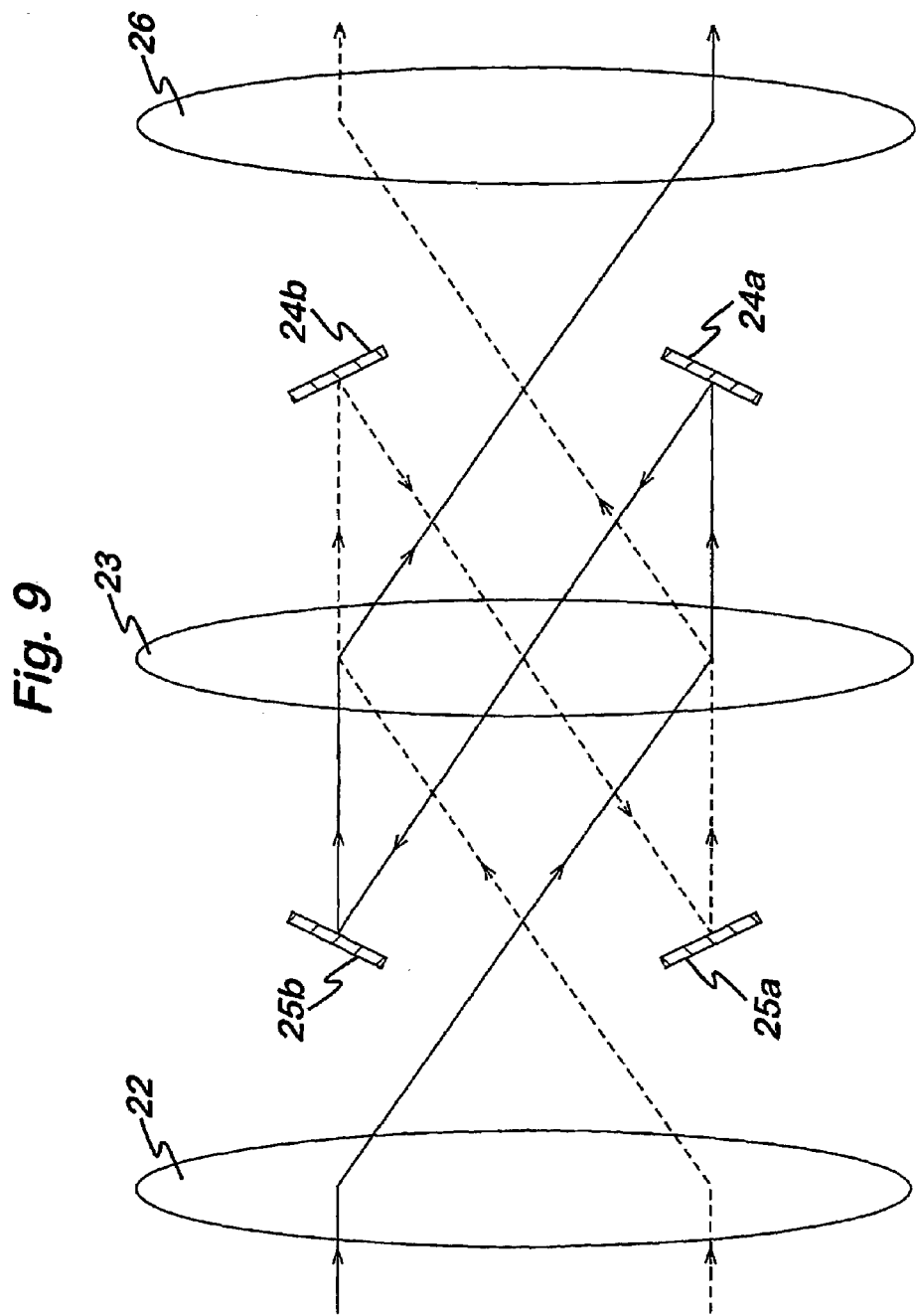
FIG. 9 is a view similar to that of FIG. 8 and shows an alternative way of controlling two light rays.

The switch shown in FIG. 8 is configured in what is known as a bar state, and FIG. 9 shows the switch configured in what is known as a cross state. FIG. 8 shows that a beam incident at the top of the lens 22 from an upper transmitter is delivered at the top of the lens 26 and hence to the top receptor. FIG. 9 shows the switch directing an incident top beam to a bottom receptor, and vice versa.

Figure 10:
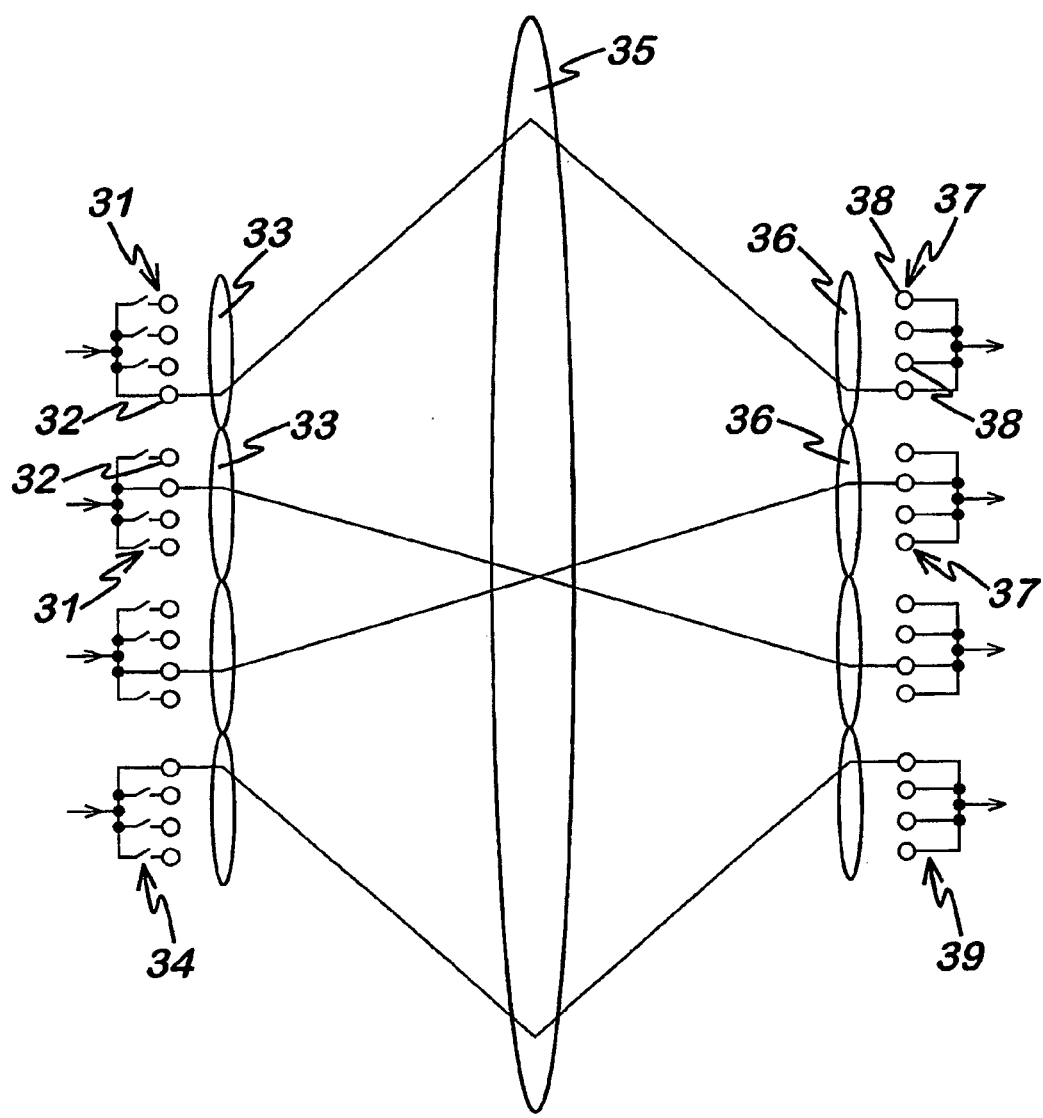
FIGS. 10 to 15 are schematic representations of alternative forms of broadcast-and-select optical crossbar switches.

FIGS. 10 to 17 show schematically alternative forms of broadcast-and-select optical crossbar switches. Thus, FIG. 10 shows a broadcast-and-select crossbar switch having a regular grid of sixteen input sources 31, each of which is constituted by a regular grid of sixteen individual light sources 32. A respective mesolens 33 is associated with each of the input sources 31. Localised electrical fan-out of the light sources 32 of each input source 31 is provided, as shown schematically by the reference numeral 34. The light sources 32 of each input source 31 are electrically gated, as indicated, so that only one of these light sources emits a light beam to the associated mesolens 33.

The light beams are re-directed by the mesolenses 33 to pass through a macrolens 35, where the beams are re-arranged. The beams then pass to a regular grid of sixteen mesolenses 36, each of which is associated with a respective output device 37. The output devices 37 are arranged in a regular grid of sixteen such devices, each of which is associated with a regular grid of sixteen light sinks 38. Localised electrical fan-in of the light sinks 38 occurs, as indicated by the reference numeral 39.

It will be apparent that, by suitable electrical gating of the light sources 32, any input source 31 can be directed to any output device 37. In this connection, it should be noted that each of the light sources 32 is associated with a respective light sink 38 of a respective output device 37. The electrical fan-out and/or fan-in may occur remotely from the optical assembly, if optical fibers are used to connect the light sources 32 and/or the light sinks 38 to the optical assembly. In this case, the light sources 32 could be, for example, VCSELs and the light sinks 38 could be, for example, photodetectors.

Figure 11:
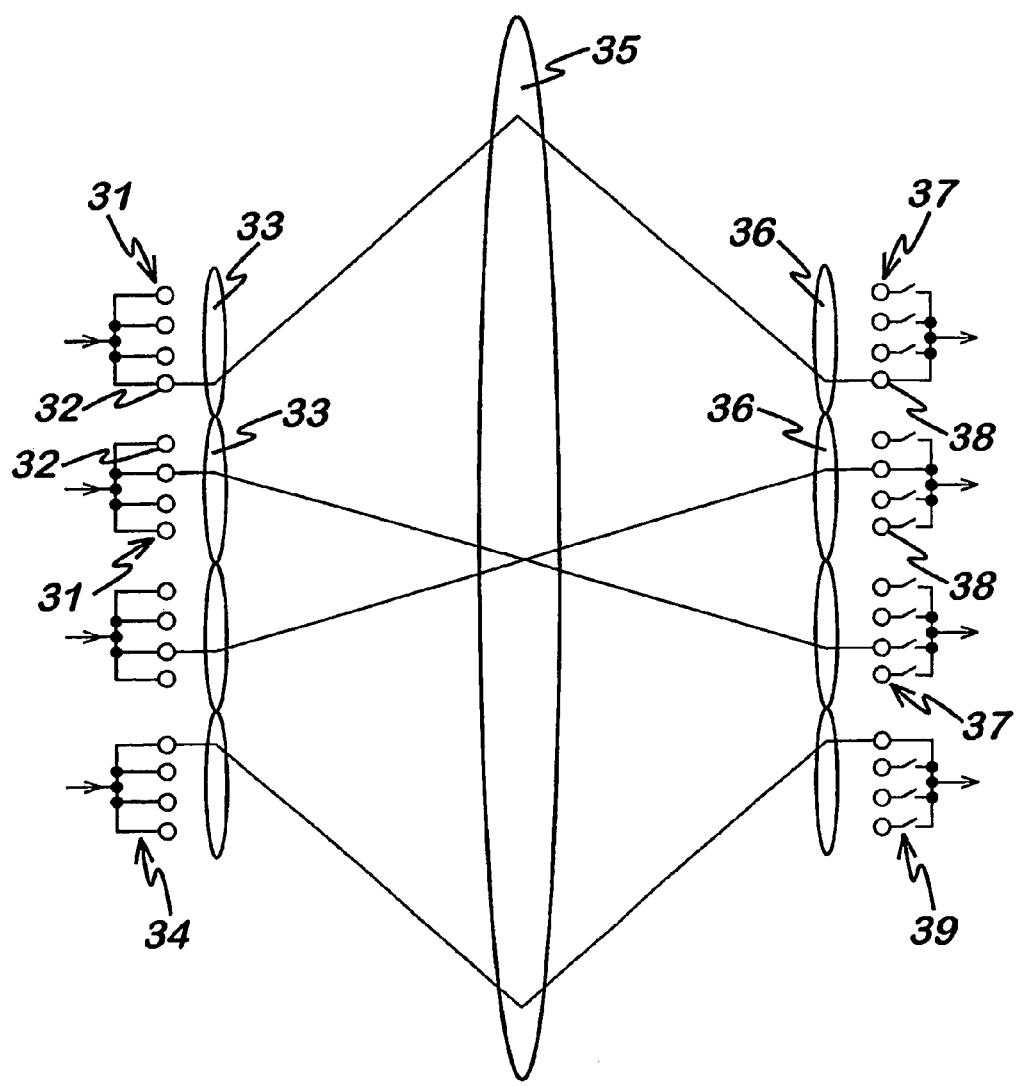

The optical crossbar switch shown in FIG. 11 is a modification of that shown in FIG. 10, so like reference numerals will be used for like parts, and only the modification will be described in detail. The only modification is that the electrical gating occurs at the localised electrical fan-in of the light sinks 38, this being indicated by the reference numeral 39. Here again, the electrical fan-out and/or fan-in may occur remotely from the optical assembly, if optical fibers are used to connect the light sources 32 and/or the light sinks 38 to the optical assembly. In this case, the light sources 32 could be, for example, VCSELs and the light sinks 38 could be, for example, photodetectors.

Figure 12:
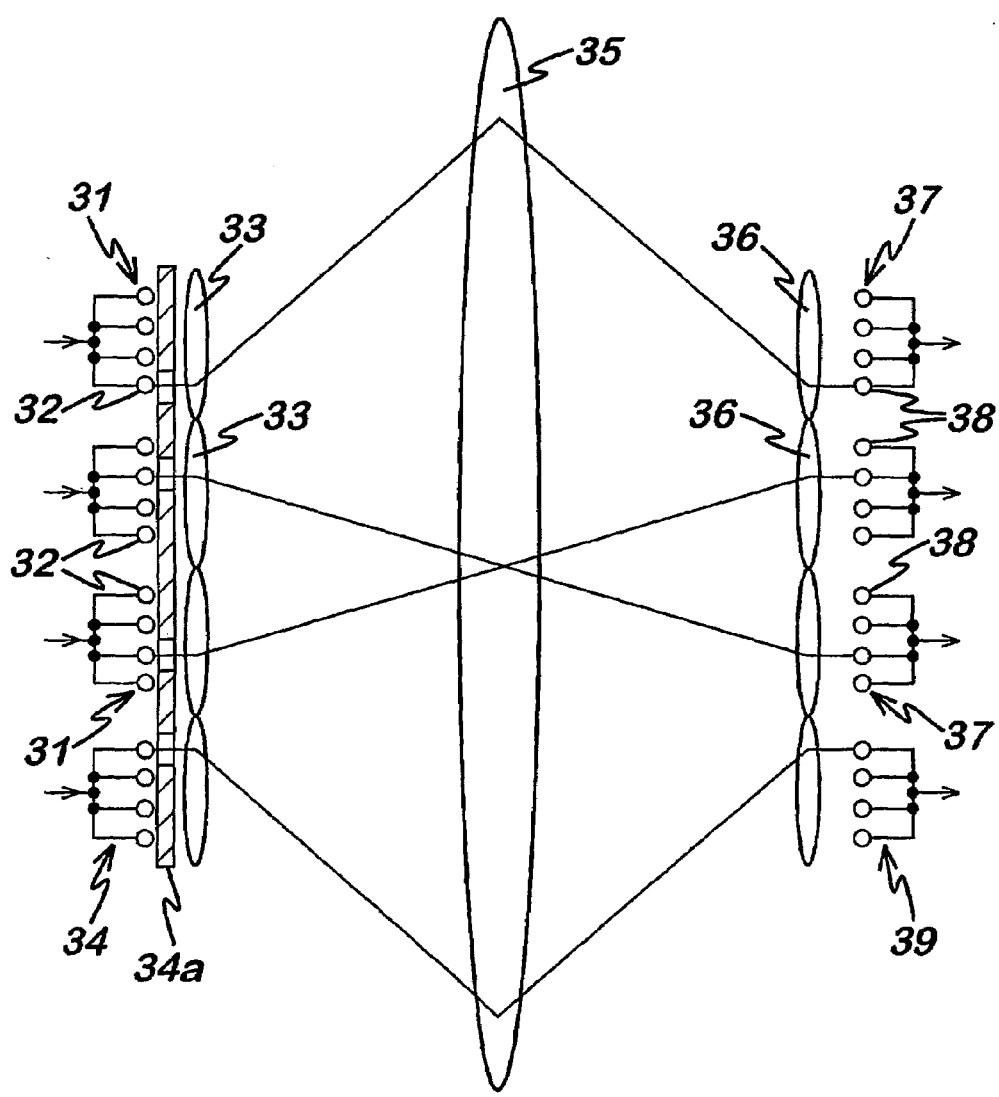

Similarly, the optical crossbar switch shown in FIG. 12 is a modification of that shown in FIG. 10, so like reference numerals will be used for like parts, and only the modification will be described in detail. Thus, this crossbar switch uses optical shuttering of the light sources 32, for example, using an SLM 34a. Here again, the electrical fan-out and/or fan-in may occur remotely from the optical assembly, if optical fibers are used to connect the light sources 32 and/or the light sinks 38 to the optical assembly. In this case, the light sources 32 could be, for example, VCSELs and the light sinks 38 could be, for example, photodetectors.

Figure 13:
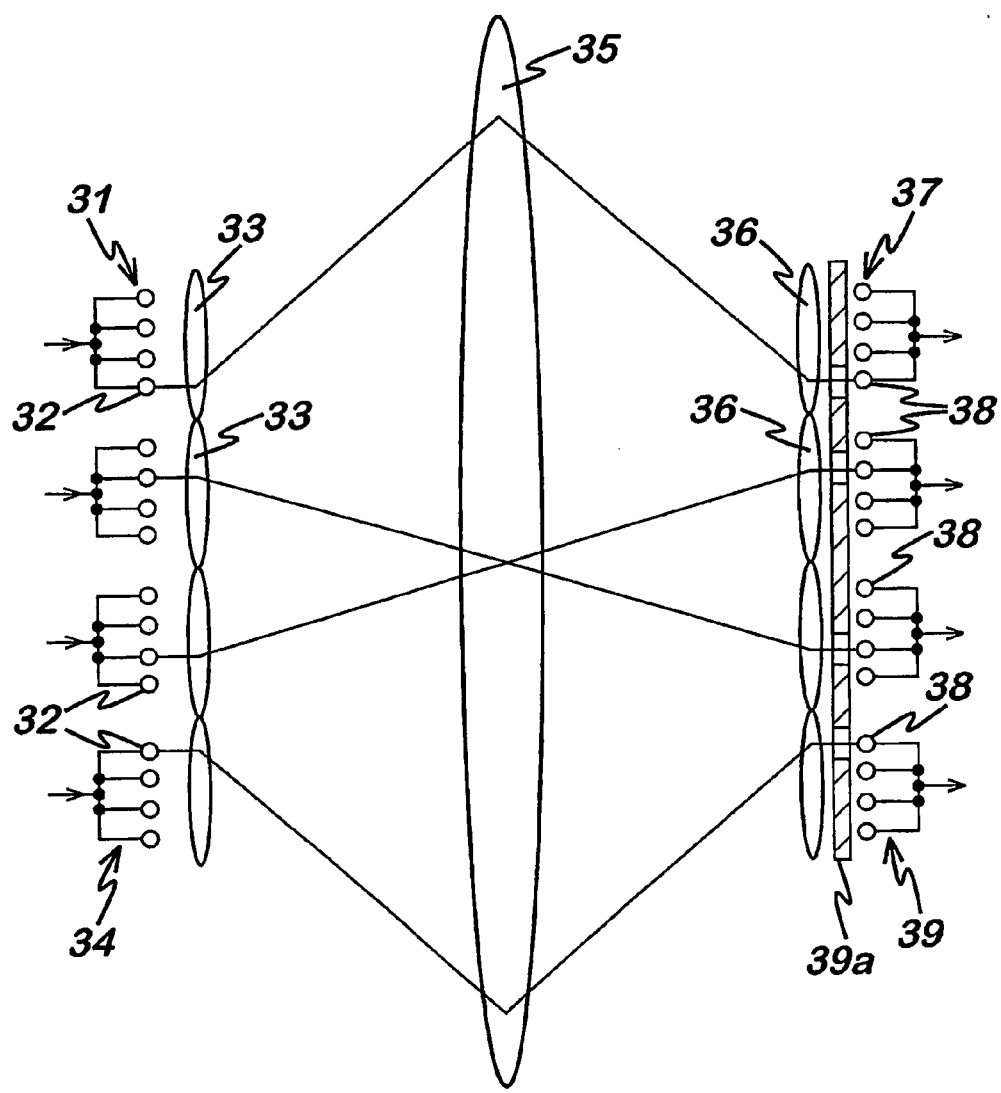

The optical crossbar switch shown in FIG. 13 is a modification of that shown in FIG. 11, so like reference numerals will be used for like parts, and only the modification will be described in detail. Thus, this crossbar switch uses optical shuttering of the light sinks 38 instead of electrical gating at the localised electrical fan-in of the light sinks. As with the embodiment of FIG. 12, the optical shuttering may be carried out using, for example, an SLM 39a. Moreover, electrical fan-out and/or fan-in may occur remotely from the optical assembly, in a similar manner to that described above with reference to any one of FIGS. 10 to 12.

Figure 14:
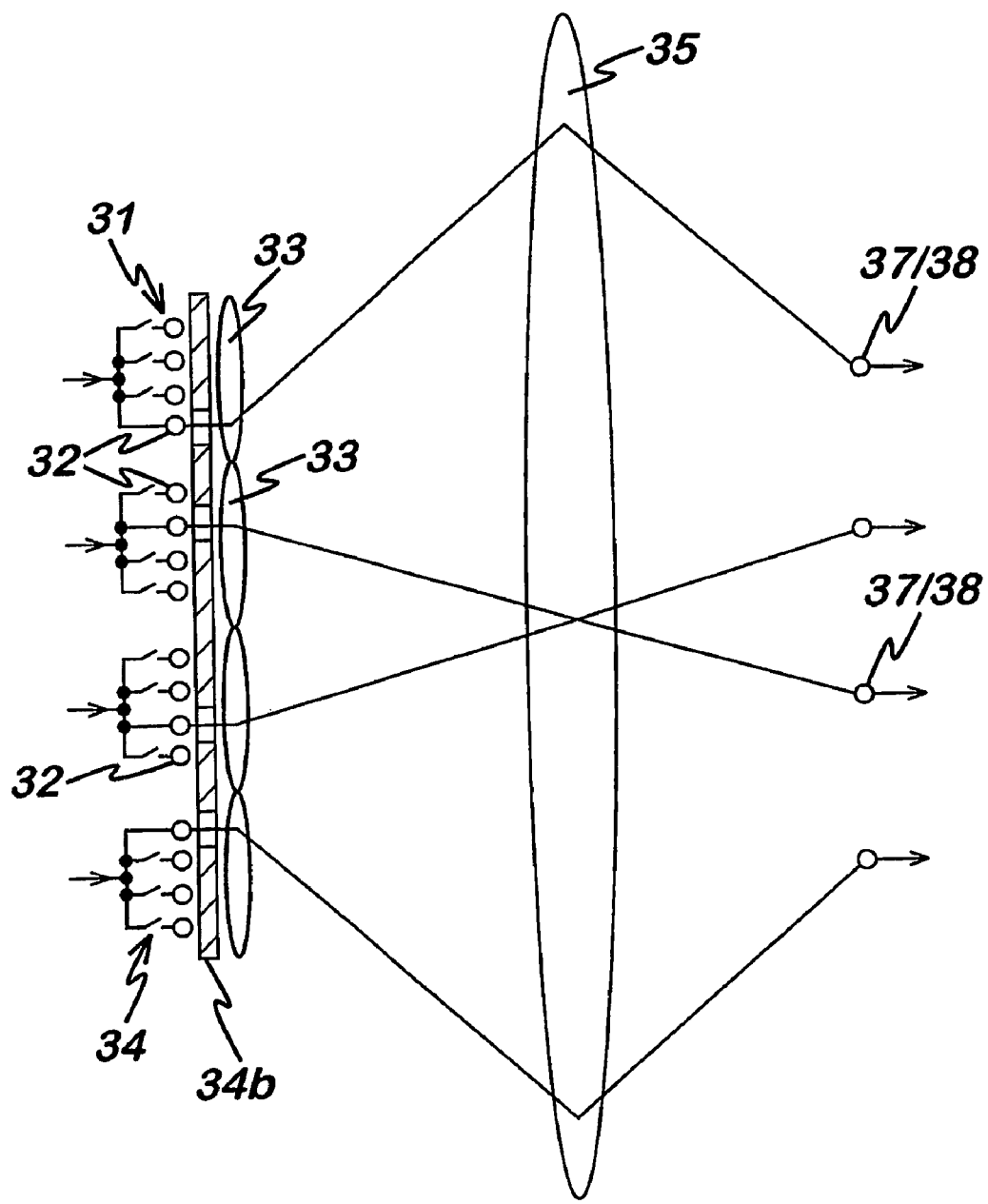

The optical crossbar switch shown in FIG. 14 is also a modification of that shown in FIG. 10, so like reference numerals will be used for like parts, and only the modification will be described in detail. Thus, this switch has only one light sink 38 for each output device 37. The switch has localised electrical fan-out of the light sources 32 of each input source 31; and electrical gating or optical shuttering (using an SLM 34b) is used at the input. FIG. 14 shows both these options, and it will be appreciated that only one of these will be used in any given optical switch. Localised fan-in to the light sinks 38 is achieved by placing these devices where the optical beams from the macrolens 35 would normally cross in front of the mesolenses 36 which are omitted in this embodiment. Moreover, as with each of the embodiments or FIGS. 10 to 13, electrical fan-out and/or fan-in may occur remotely from the optical assembly. Fan-in to fibers without loss is only possible when using multimode fibers. In essence, this is a realisation of the architecture of FIG. 10 or FIG. 12 using optical fan-in.

Figure 15:
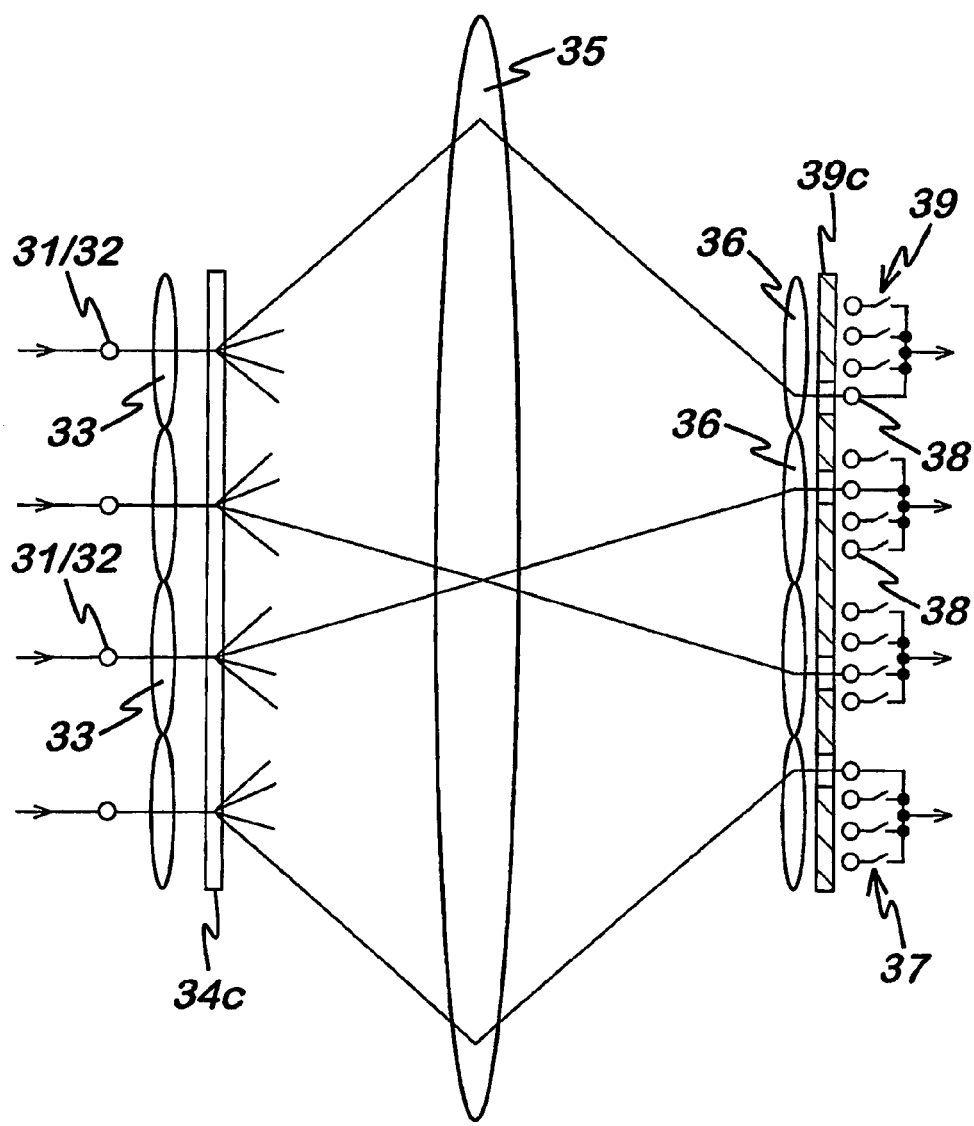

The optical switch of FIG. 15 is a modification of that FIG. 14, so like reference numerals will be used for like parts, and only the modification will be described in detail. Thus, this switch has only one light source 32 for each input source 31. Localised optical fan-out of the input sources 31 is effected by using a multiple beam splitter (for example a grating) 34c provided downstream of the mesolenses 33. Electrical gating or optical shuttering (using an SLM 39c) of the light sinks 38 is carried out. FIG. 15 shows both these options, and it will be appreciated that only one of these will be used in any given optical switch. In essence, this is a realisation of the architecture of FIG. 11 or FIG. 13 using optical fan-out.

Figure 16:
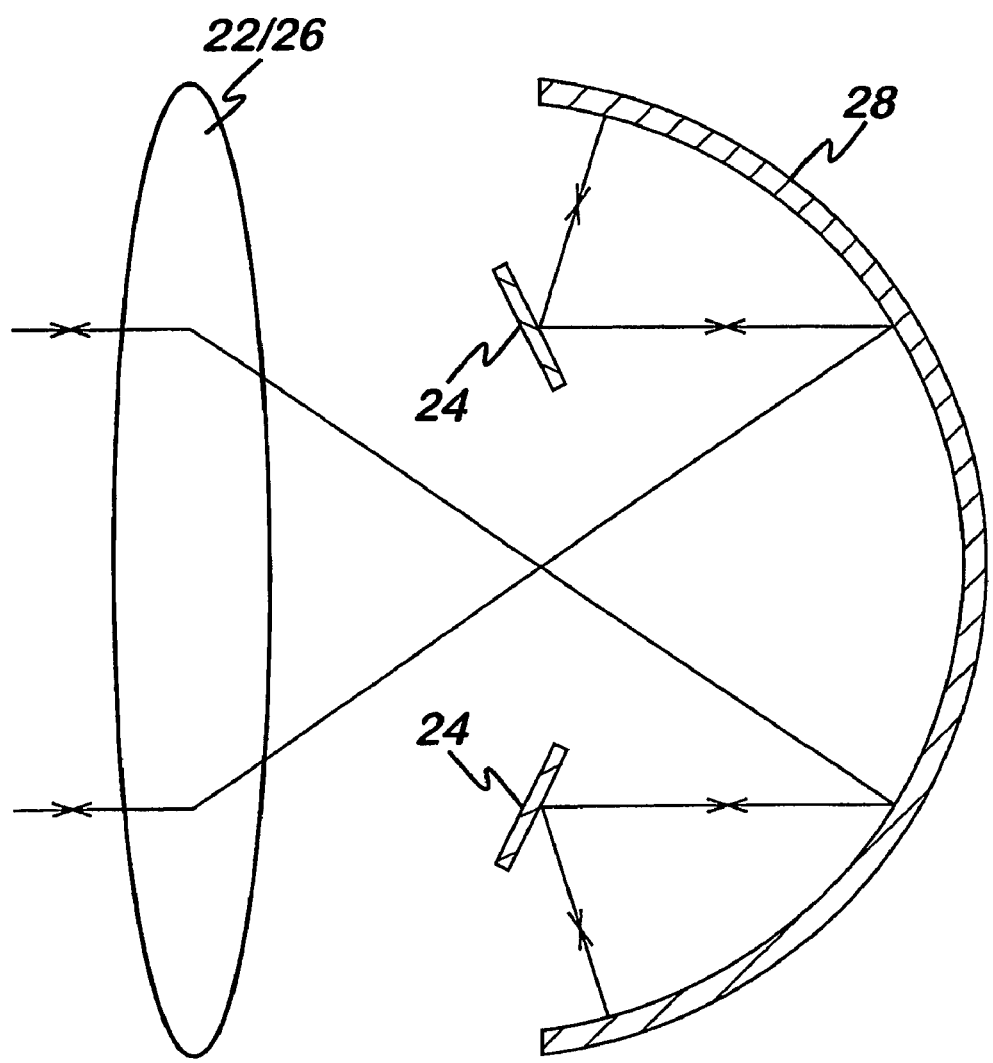
FIG. 16 is a schematic representation of a modified form of the route-and-select switch of FIG. 8.

FIG. 16 is a schematic representation of a modified form of the switch shown in FIG. 8, illustrating how two incident beams are routed through the switch. The central macrolens 23 of the FIG. 8 switch is, here, replaced by a reflective concave mirror 28. A macrolens 22/26 to the left of the mirror 28 acts as both an input lens and an output lens. For simplicity, FIG. 16 shows only the macrolens 22/26, a pair of deflectors 24 and the curved mirror 28. Input sources (not shown) and light sinks (not shown) are positioned to the left of the input/output lens 22/26, these devices thus constituting bi-directional ports. Alternatively, two sets of input and output ports may be co-located. FIG. 16 shows two light beams incident upon the lens 22/26 from respective light sources. Each of these beams passing through the lens 22/26, then to the mirror 28, then to a respective one of the deflectors 24, then to the mirror, where it is reflected back to the same deflector. After this, each of the beams passes again to the mirror 28 where it is reflected back through the lens 22/26, and hence to a respective light sink. As with the arrangement of FIG. 8, this switch is configured in what is known as a bar state.

Figure 17:
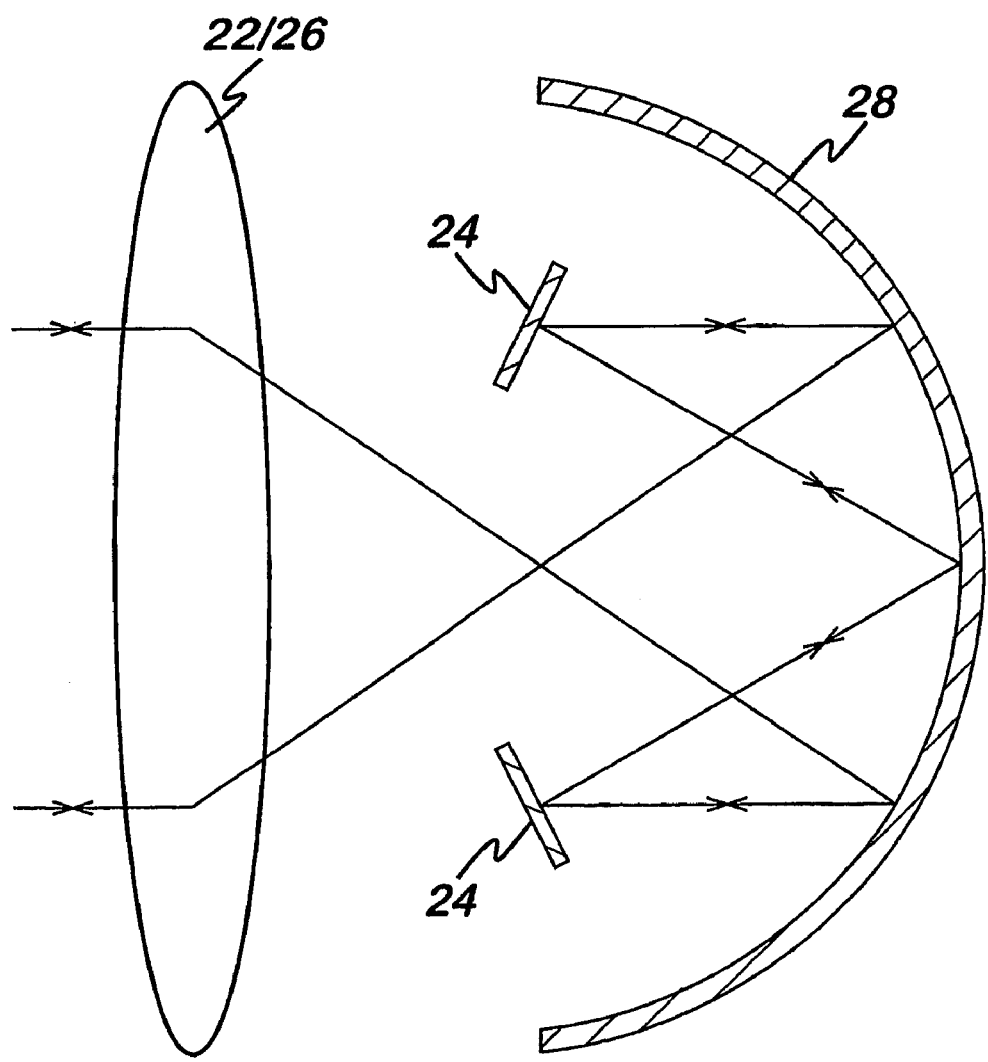
FIG. 17 is a schematic representation of a modified form of the route-and-select switch of FIG. 9.

FIG. 17 is a schematic representation of a modified form of the switch shown in FIG. 9, and is similar to the switch of FIG. 16, in that it includes an input/output macrolens 22/26, a curved mirror 28 and a pair of deflectors 24. As with the embodiment of FIG. 16, input sources (not shown) and light sinks (not shown) are positioned to the left of the input/output lens 22/26, these devices either being co-located or constituting bi-directional ports. Here again, FIG. 17 shows the route of two beams passing through the switch. As with the arrangement of FIG. 9, the switch is configured in what is known as a cross state.

Figure 18:
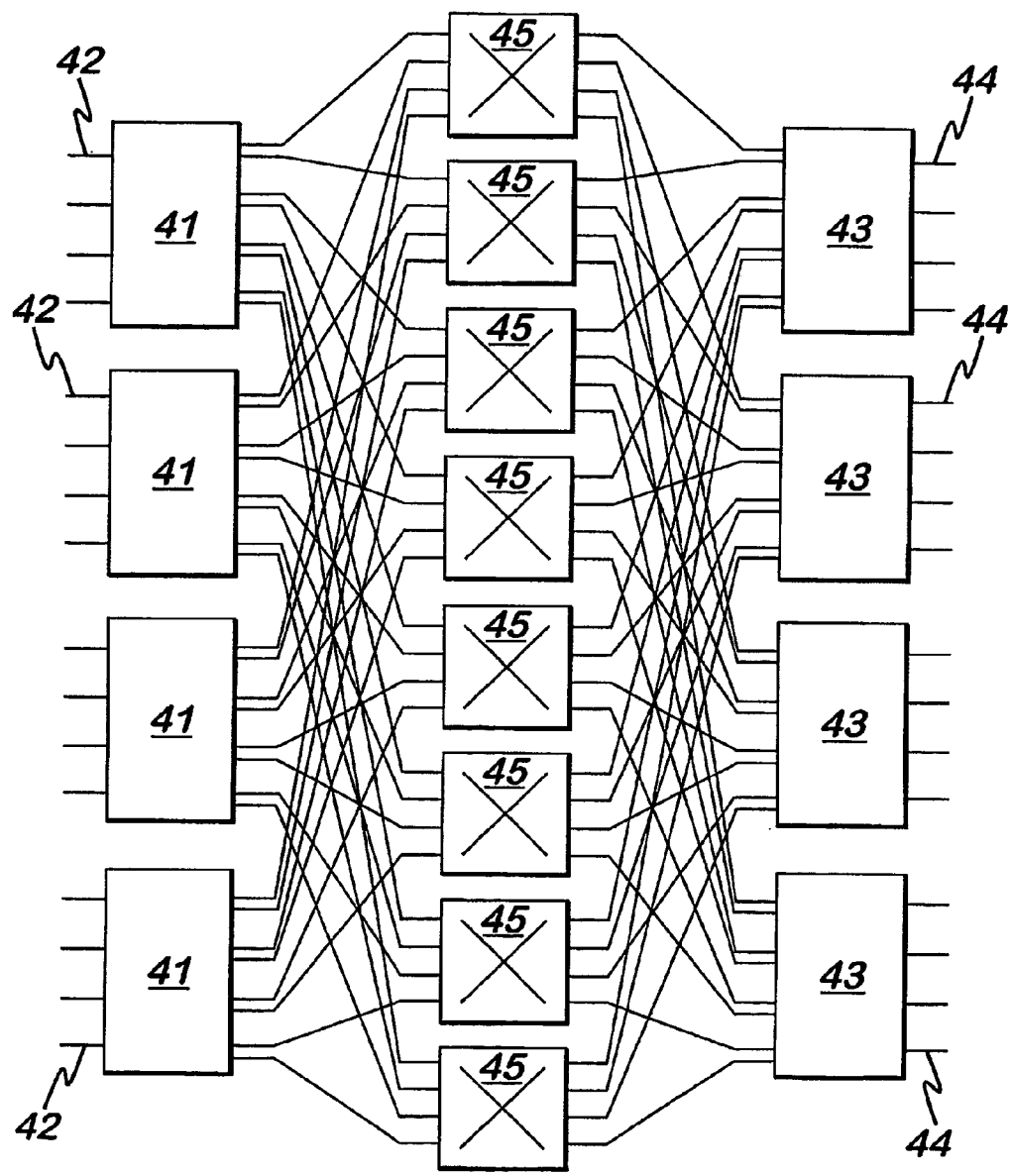
FIG. 18 is a schematic representation of a multi-stage optical crossbar switch assembly.

FIG. 18 illustrates schematically the large switch constructed using multiple stages, each containing a number of basic switch modules. Thus, this switch includes four input sectors 41, each of which has four input ports 42. The input sectors 41 are connected to four output sectors 43, each of which has four output ports 44, via eight 4×4 crossbar switches 45. This arrangement permits the number of connections between any sector pair to be varied between zero and eight paths. If the input and output sectors 41 and 43 are also crossbar switches, the result is a 16×16 Clos switch that is capable of strictly non-blocking interconnection of any input port/output port pair. A transpose interconnection appears naturally between the stages of this switch, this switch is known as a "sector switch", and is constituted by the central stage of eight crossbar switches 45 together with the two transpose interconnections between that stage and the input and output sectors 41 and 43.

Figure 19:
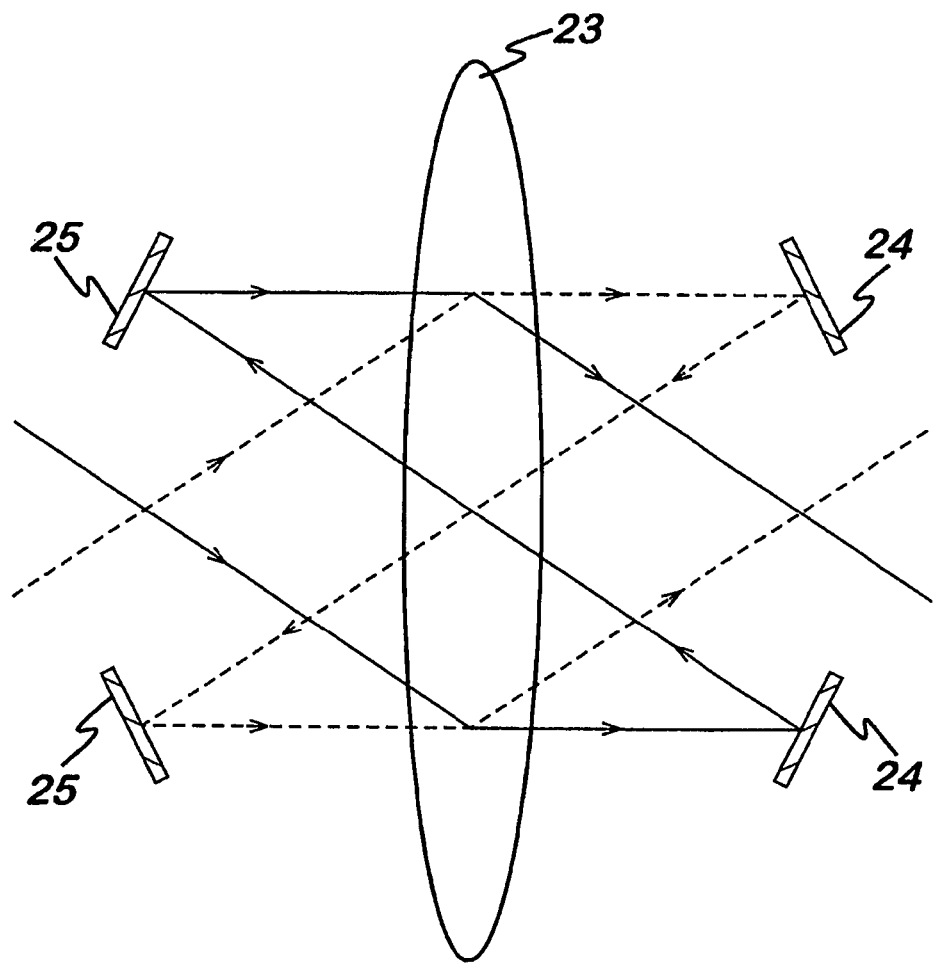
FIG. 19 is a schematic representation illustrating part of the crossbar switch assembly of FIG. 18.

FIG. 19 illustrates schematically one of the crossbar switches 45 of FIG. 18. This switch is substantially identical to that of FIG. 9 without the first and third stage lenses 22 and 26. Thus, this switch 45 has a central macrolens 23 and deflectors 24 and 25. For simplicity, only two input beams (shown respectively in full and dotted lines) are shown, these beams coming from input sectors 41 of the switch assembly shown in FIG. 18. Similarly, the output beams from the switch 45 pass to output sectors 43 of the assembly of FIG. 18.

The arrangement of FIG. 19 uses reflective deflectors 24 and 25, but the arrangement could be modified to use transmissive devices. It would also be possible to use a curved mirror such as the mirror 28 of FIG. 16 or FIG. 17 with the lens 23 removed. Indeed, any other arrangement capable of accepting angularly-multiplexed beams at an input port, re-arranging these beams amongst themselves, and delivering them in a angularly-multiplexed form to an output port may be used.

Figure 20:
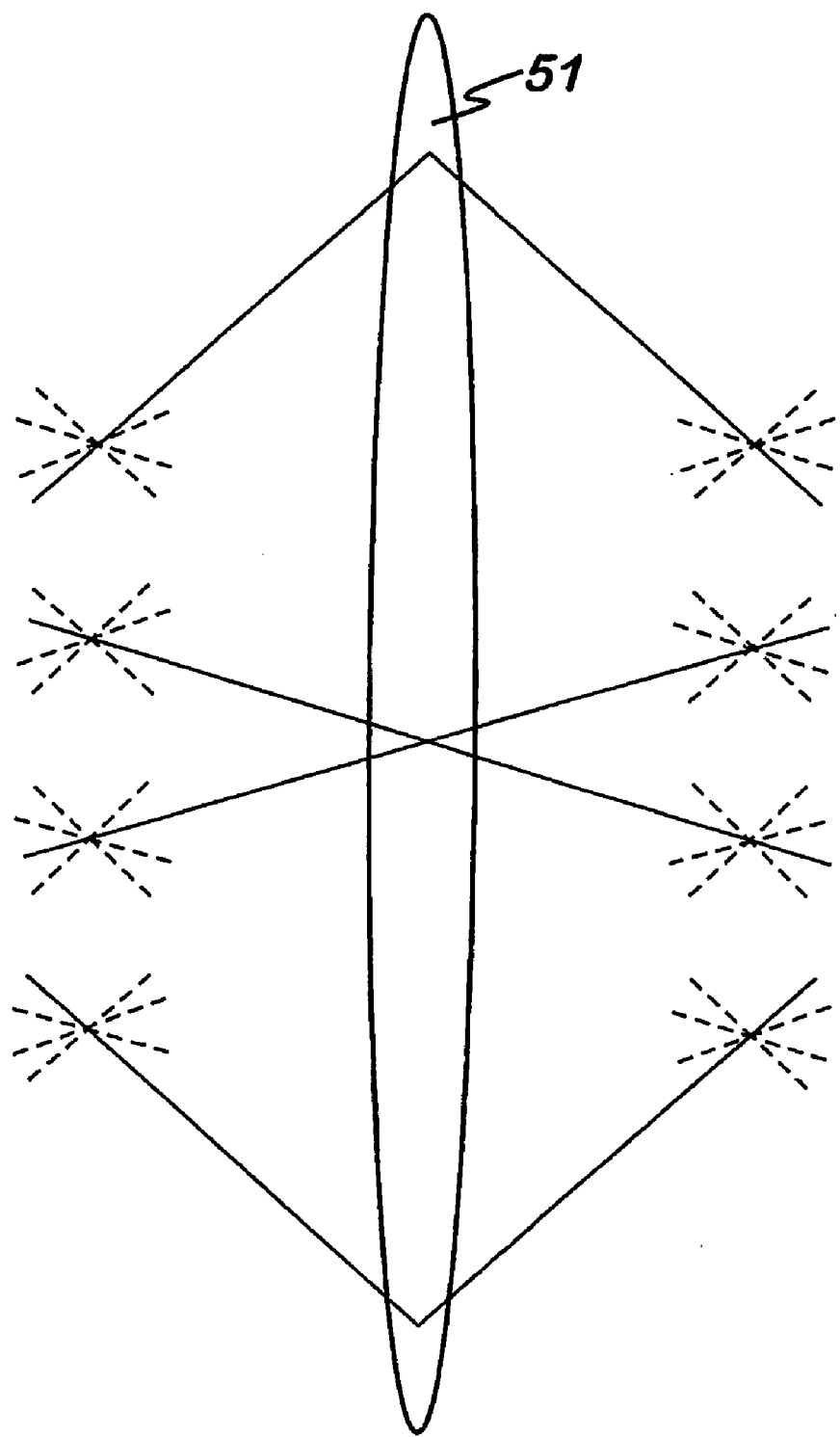
FIG. 20 is a schematic representation illustrating another part of the crossbar switch assembly of FIG. 18.

FIG. 20 illustrates an optical transpose interconnection between the input sectors 41 and the array of optical crossbar switches 45 of the switch assembly of FIG. 18. This arrangement is basically the optical transpose system of our International patent application number PCT/GB01/03643 with the first and third stage mesolenses removed. Thus, a central macrolens 51 performs a transpose interconnection between angularly-multiplexed beams, the input beams coming from the input sectors 41, and the output beams going to the optical crossbar switches 45 of the assembly of FIG. 18. A similar optical transpose system is provided between the array of crossbar switches 45 and the array of output sectors 43.

The arrangement of FIG. 20 is a transmission geometry arrangement, but any other arrangement capable of performing an optical transpose interconnection between angularly-multiplexed beams may be used. Moreover, for clarity, not all the beam paths are shown in FIG. 20.

Figure 21:
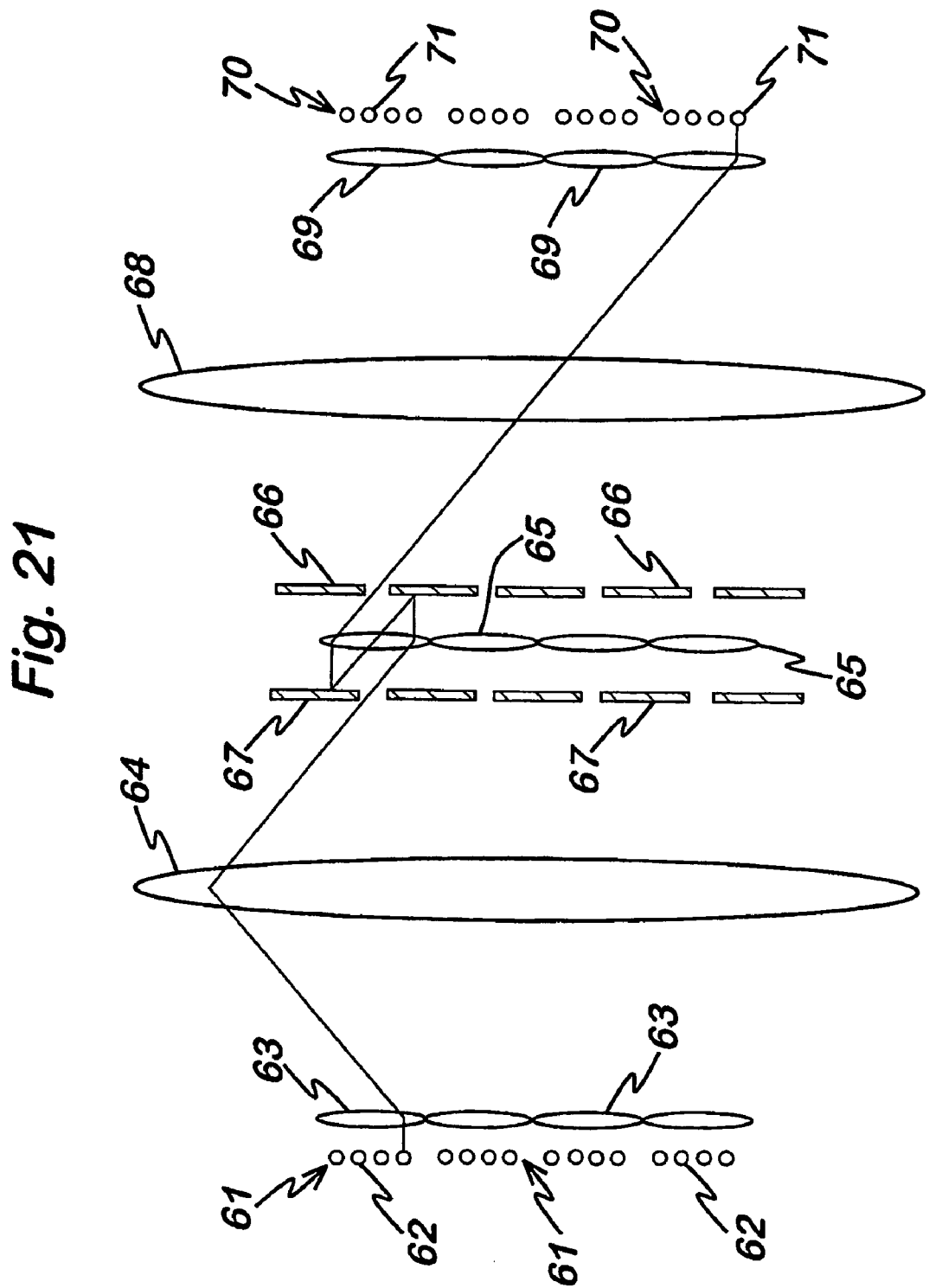
FIG. 21 is a schematic representation illustrating the crossbar switch assembly of FIG. 18 with electronic input and output stages.

FIG. 21 illustrates schematically an implementation of the switch assembly of FIG. 18, having electronic control of the input and output stages. Thus, as shown in FIG. 21, a 4×4 array of input sources 61, each of which is constituted by a regular 4×4 grid of sixteen light sources 62, is provided. Each of the light sources 62 is electronically controlled by means (not shown), and a respective mesolens 63 is associated with each input source 61. The mesolenses 63 angularly-multiplex light beams incoming thereto, and pass these to a macrolens 64. The macrolens 64 carries out an optical transpose in the manner described above with reference to FIG. 20. The re-arranged beams leaving the macrolens 64 then pass to a central crossbar switch array similar to the crossbar switches 45 of FIG. 18. This array is basically a 4×4 grid of the optical switches 45 of FIG. 18. The array thus has sixteen mesolenses 65 in a regular 4×4 grid, with deflectors 66 and 67 on opposite sides thereof.

FIG. 21 shows the path of one light beam from a light source 62, this light beam passing through a first stage mesolens 63, the macrolens 64, a central stage mesolens 65, a deflector 66, the same central stage mesolens 65, and a deflector 67. The beam then passes back through the same central mesolens 65 and on to a second macrolens 68, which carries out another optical transpose similar to that of FIG. 20. The re-arranged light beams leave the second macrolens 68 and pass to a third stage array of 16 mesolenses 69, where input angularly-coded beams are de-multiplexed into spatially separate beams for passage to one of a regular 4×4 grid of output devices 70, each of which is constituted by a regular 4×4 grid of light sinks 71.

FIG. 21 is, therefore, an example of a re-arrangable non-blocking transparent optical sector switch consisting of a sandwich of two 256×256 optical transpose stages, and a 4×4 array of optical route-and-select switches. Each route-and-select switch can re-arrange fifteen off-axis angularly-multiplexed beams, and can also provide one fixed on-axis path. The sixteen switches each have fifteen ports, each of which can be connected to any output sector (subject to the overall interconnection being one-to-one), plus one additional port that has a fixed connection to its corresponding sector by the fixed central stage paths. Strictly non-blocking operation may be achieved by increasing the number of route-and-select switches in the central stage, and re-dimensioning the transpose interconnections appropriately.

Figure 22:
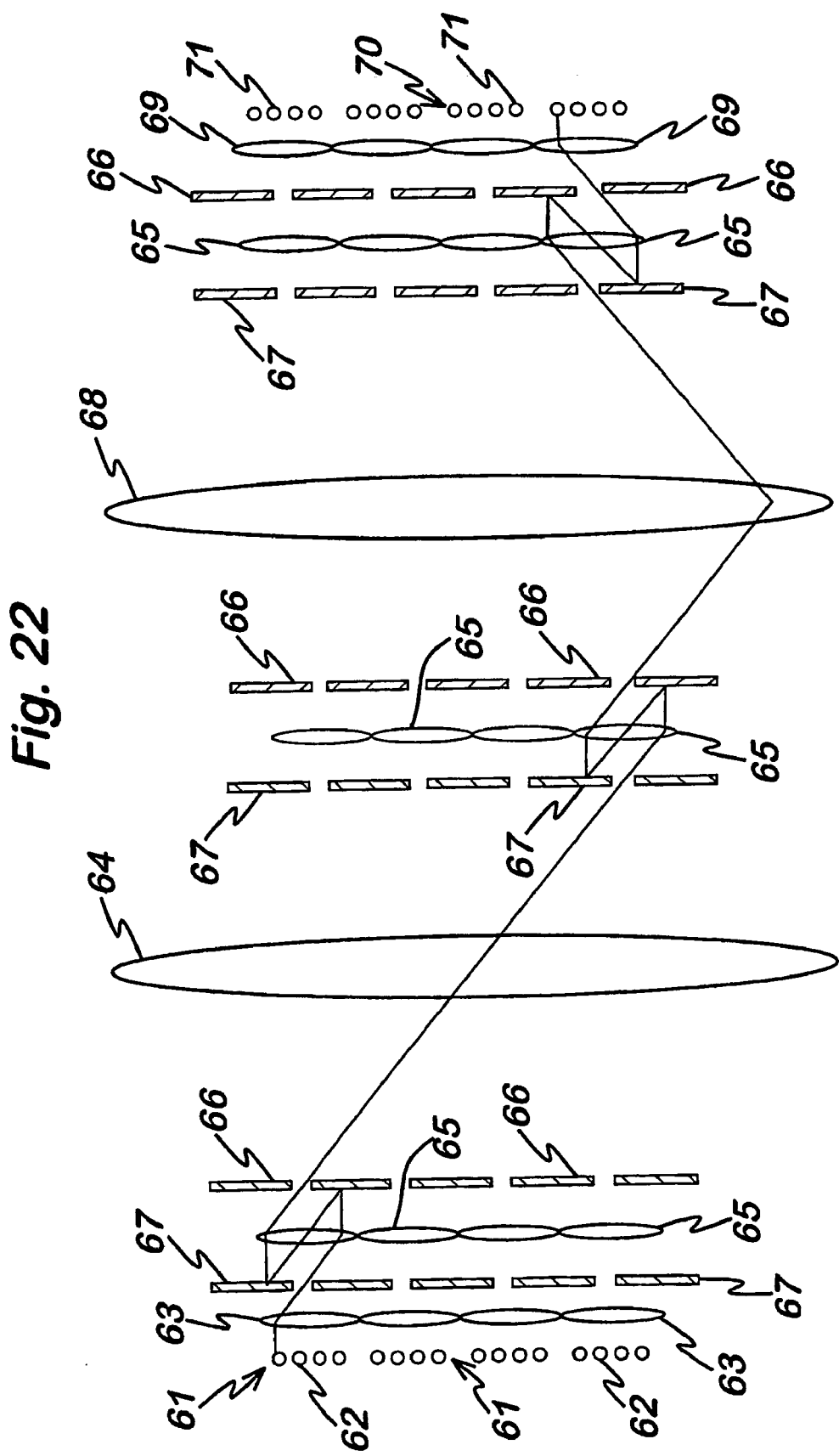
FIG. 22 is a schematic representation illustrating the crossbar switch assembly of FIG. 18 with an all-optical implementation.

FIG. 22 illustrates schematically an all-optical implementation of the switch assembly of FIG. 18. The central portion of this embodiment is identical with the central portion of the embodiment of FIG. 21, so like reference numerals will be used for like parts, and only the input and output stages will be described in detail. Similarly, this embodiment has input sources 61 constituted by light sources 62, input mesolenses 63, output mesolenses 69, output devices 70 and light sinks 71, all of which are as described above with reference to FIG. 21.

A 4×4 array of crossbar switches similar to the switches 45 of FIG. 18 is positioned between the first stage mesolenses 63 and the macrolens 64. A similar 4×4 array of crossbar switches similar to the switches 45 of FIG. 18 is arranged between the macrolens 68 and the third stage mesolenses 69. Each of these crossbar switch arrays has sixteen mesolenses 65 in a regular 4×4 grid, with deflectors 66 and 67 on opposite sides thereof.

FIG. 22 shows the path of one light beam from a light source 62, this beam passing through a first stage mesolens 63, a mesolens 65 of the first stage array of optical crossbar switches, and then onto the macrolens 64 via the deflectors 66 and 67 and the same mesolens 65. Passage of this light beam is then the same as for the embodiment of FIG. 21, until the beam leaves the macrolens 68, when it passes through a mesolens 65 of the third stage array of optical crossbar switches, and then onto a light sink 71 via the deflectors 66 and 67, the same mesolens 65 and a mesolens 69.

FIG. 22 is, therefore, an example of a re-arrangeable non-blocking transparent optical Clos switch. In the example shown, 15×15 inputs may be connected in any permutation to the same number of outputs. Connections may also be set up between a total of 16×16 inputs and 16×16 outputs, by making use of the less flexible fixed on-axis path through the route-and-select switches. Strictly non-blocking operation may be achieved by increasing the number of centre stage route-and-select switches, and re-dimensioning the transpose interconnection stages appropriately.

Each of the optical crossbar switches described above could be configured as a fixed arbitrary interconnection, or as a re-configurable interconnection. In the former case, the deflectors would be configured by using a deflection technology that may be custom designed, but is otherwise permanent. Computer generated holography (CGH) is a suitable technology for such deflectors. Masks that define the microstructure of a CGH deflector are designed by a computer. There are also low cost manufacturing methods that allow the replication of a master CGH deflector, for example by embossing. A CGH deflector can contain one or more grating structures that diffract incident light into one or more desired directions. CGH deflectors may be made in transparent materials for use in the transmission geometry configurations, or they may be made in reflective materials for use in the reflection geometry configurations.

It would also be possible to use other deflection technologies such as micro mirrors, prisms and beam splitters. A master deflector might be made using some flexible manufacturing process (such as diamond turning), and then replicated, for example by embossing. It is also possible to use materials that permanently change structure in response to a suitable treatment such as optical exposure.

Where a re-configurable interconnection is required, any electro-optic technology capable of forming gratings, prisms or mirrors can be used. In particular, SLMs can be used as programmable CGH deflectors, that is to say as variable gratings. SLMs can be transmissive or reflective. In the case of liquid crystal based SLMs, a plane mirror is placed behind the liquid crystal cell to achieve reflective operation. The reflective geometry is the most convenient when using silicon VLSI electronics to address the individual pixels of the SLM. A variable reflection grating emulates a re-orientable mirror. However, strictly speaking, the physics is different, as gratings rely on diffraction and mirrors on reflection.

Liquid crystal devices that act as variable gratings, prisms and even lenses might be used in the re-configurable interconnections. The micro electro mechanical systems (MEMS) technology could be used to translate microlenses or rotate microprisms to effect a deflection, rather than using gimballed micromirrors. Deformable mirror technology also exists in which piezo actuators deform a flexible or faceted mirror. A "phase only" silicon MEMS SLM, that is essentially a miniature version of the type of faceted mirror used in astronomy, may also be used. In this case, a variable phase grating would be formed.

It will also be appreciated that beam splitting mirrors (for example reflective multiplexed gratings) may constitute the deflectors of any of the embodiments described above, thereby to implement multi-casting at the price of fan-out loss. If more than one channel is fanned-in to an output that supports fewer transverse modes than the number of beams fanned in, there is also a fan-in loss.

It will be apparent that modifications could be made to the optical crossbar switches described above. In particular, the use of concave lenses at the input and output would result in slightly shorter systems, and the system may be folded to reduce length, by using mirrors.

Overall, this system produces the Fourier transform, at the output, of a beam at the associated input. Conventional systems would, on the other hand, image. However, by suitable choice of lenses, it is possible to arrange that the size and numerical apertures of the beams at the input and the output are identical, allowing interfacing with optical fibres without loss in principle. In particular, in the case of monomode beams, a Gaussian input beam is transformed to a Gaussian output beam. If necessary, an imaging system can be achieved by displacing the inputs and outputs from the focal planes, or by using supplementary optics.

In the reflective configurations, the action of the first deflector encountered is to route to a destination, and the action of the second deflector encountered is to select an input.

Advantages of the reflective arrangements are:
1. There is no optical fan-out/fan-in for a unicast connection, in contrast to a broadcast-and-select switch. The system is, therefore, lossless in principle, even when working between mono mode fibre inputs and outputs.
2. The deflectors operate in reflection, which permits the use of devices made on the surface of plane substrates, for example MEMS mirror arrays, ferroelectric liquid crystal over Si VLSI SLMs.
3. A reflective geometry is achieved without the use of beam splitters that introduce excessive insertion loss or polarisation sensitivity, if polarisation beam splitters are used to avoid insertion loss. The system is, therefore, suitable for use in optical fibre communications applications.
4. It is transparent, and there is no restriction to the data rate. Only the reconfiguration time is restricted by the deflection technology used.
5. It is bi-directional, so that the system is compatible with full duplex operation.
6. It is wavelength independent (when using mirror deflectors) or wavelength insensitive (when using grating deflectors). The system is, therefore, compatible with wavelength division multiplexed (WDM) systems.

The invention claimed is:

1. An optical crossbar switch comprising a plurality of input devices, a plurality of output devices, an optical transpose system positioned between the input devices and the output devices, and control means for controlling the interconnections between the input devices and the output devices, wherein the optical transpose system has first, second and third stages, the first stage being such as to direct light from the input devices to the second stage, the second stage being such as to re-arrange beams input thereto from the first stage for re-direction to the third stage, and the third stage being such as to direct light input thereto to the output devices, and wherein each of the first, second, and third stages operates as a Fourier transform stage such that the optical transpose system produces at each output device a Fourier transform of a beam at the associated input device.

2. A switch as claimed in claim 1, wherein the switch is configured as a broadcast-and-select switch.

3. A switch as claimed in claim 2, wherein the control means is constituted by means for electrically gating the input devices.

4. A switch as claimed in claim 2, wherein the control means is constituted by means for electrically gating the output devices.

5. A switch as claimed in claim 2, wherein the control means is constituted by means for optically shuttering the input devices.

6. A switch as claimed in claim 2, wherein the control means is constituted by means for optically shuttering the output devices.

7. A switch as claimed in claim 1, wherein each of the input devices is constituted by a plurality of light sources, and each of the output devices is constituted by a plurality of light sinks.

8. A switch as claimed in claim 7, wherein the switch is configured as a route-and-select switch.

9. A switch as claimed in claim 8, wherein the route-and-select switch is configured using transmission geometry.

10. A switch as claimed in claim 9, wherein the first stage is constituted by a plurality of first mesolenses, there being one first mesolens associated with each of the input devices, the second stage is a macrolens, and the third stage is a plurality of second mesolenses, there being one second mesolens associated with each of the output devices, and wherein the control means is constituted by a plurality of first deflectors, each first deflector being associated with a respective first mesolens, and by a plurality of second deflectors, each second deflector being associated with a respective second mesolens.

11. A switch as claimed in claim 10, wherein each of the deflectors is a programmable deflector.

12. A switch as claimed in claim 11, wherein each of the deflectors is a transmission SLM.

13. A switch as claimed in claim 8, wherein the route-and-select switch is configured using reflection geometry.

14. A switch as claimed in claim 13, wherein respective first, second and third macrolenses constitute the first, second and third stages, and wherein the control means is constituted by a plurality of first deflectors positioned between the second and third macrolenses, and by a plurality of second deflectors positioned between the first and second macrolenses, there being the same number of first and second deflectors as there are input devices and output devices, the first stage directing the light from the input devices so as to pass a first time through the second stage onto the first deflectors, the first deflectors redirecting the light so as to pass a second time through the second stage onto the second deflectors and the second deflectors redirecting the light so as to pass a third time through the second stage to the output devices.

15. A switch as claimed in claim 14, wherein each of the deflectors is a programmable deflector.

16. A switch as claimed in claim 15, wherein each of the deflectors is a reflective SLM.

17. A multi-stage optical crossbar switch array constituted by a plurality of optical crossbar switches, each of which is as claimed in claim 1, wherein a respective optical transpose system is positioned between each pair of adjacent optical crossbar switches.

18. A switch as claimed in claim 1, wherein a macrolens forms the first stage and third stage, and the second stage comprises a curved mirror, and further comprising a deflector array positioned between the macrolens and the curved mirror, the deflector array and curved mirror being arranged such that light from the input devices passes a first time through the macrolens onto the curved mirror and is reflected back and forth between die curved mirror and the deflector array, the curved mirror finally reflecting the light a second time through the macrolens to the output devices.

19. A switch as claimed in claim 1, wherein the first stage comprises a first macrolens shared by the plurality of input devices, the second stage comprises a second macrolens shared by the plurality of input devices and the plurality of output devices, and the third stage comprises a third macrolens shared by the plurality of output devices, and wherein the control means comprises a first deflector array positioned between the second macrolens and the third macrolens, and a second deflector array positioned between the second macrolens and the first macrolens, such that the first macrolens directs the light from the input devices so as to pass a first time through the second macrolens onto the first deflector array, the first deflector array redirects the light so as to pass a second time through the second macrolens onto the second deflector array, and the second deflector array redirects the light so as to pass a third time through the second macrolens and then through the third macro lens to the output devices.

\* \* \* \* \*

UNITED STATES PATENT AND TRADEMARK OFFICE
CERTIFICATE OF CORRECTION

PATENT NO. : 7,127,136 B2
APPLICATION NO. : 10/494887
DATED : October 24, 2006
INVENTOR(S) : Hall It is certified that error appears in the above-identified patent and that said Letters Patent is hereby corrected as shown below:

Column 11,

Line 23, "transmission" should read --transmissive--.

Column 12,

Line 36, "macro lens" should read --macrolens--.

Signed and Sealed this

Twentieth Day of March, 2007

JON W. DUDAS
*Director of the United States Patent and Trademark Office*